United States Patent
Banks et al.

(10) Patent No.: US 6,324,744 B1
(45) Date of Patent: Dec. 4, 2001

(54) METHOD OF MOUNTING AND AXIALLY ALIGNING AN ENGINE ACCESSORY

(75) Inventors: Thomas M Banks, Ypsilanti; Kenneth W Wheat, Dearborn; Vem L Chuang, Bloomfield Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/563,898

(22) Filed: May 3, 2000

(51) Int. Cl.[7] .............................. F16C 11/00; F16C 11/04; B23P 11/00
(52) U.S. Cl. ..................................... 29/525.13; 29/525.02; 29/525.08; 29/525.11; 123/195 A; 248/608; 403/158
(58) Field of Search ........................... 29/888.01, 525.02, 29/525.08, 525.11, 525.13; 123/195 A, 198 R, 198 C; 403/156, 157, 158; 248/608, 228.5, 231.61

(56) References Cited

U.S. PATENT DOCUMENTS

| | | | |
|---|---|---|---|
| 2,937,040 | * | 5/1960 | Hutton . |
| 3,018,667 | | 1/1962 | Spietz . |
| 3,362,243 | | 1/1968 | Ferguson . |
| 3,730,147 | | 5/1973 | Buchwald . |
| 4,221,982 | * | 9/1980 | Raver et al. . |
| 4,633,828 | | 1/1987 | Steela . |
| 4,808,023 | * | 2/1989 | Arnold et al. ............. 403/157 |
| 4,835,428 | * | 5/1989 | Komurasaki et al. . |
| 4,849,665 | * | 7/1989 | Kitamura et al. . |
| 4,899,703 | * | 2/1990 | Buferne . |
| 5,065,713 | | 11/1991 | Seats . |
| 5,219,138 | * | 6/1993 | Shier et al. . |
| 5,269,662 | * | 12/1993 | Denton et al. . |

FOREIGN PATENT DOCUMENTS

| | | | |
|---|---|---|---|
| 2240585 | * | 8/1991 | (GB) . |
| 6-317176 | * | 11/1994 | (JP) . |
| 8-205464 | * | 8/1996 | (JP) . |
| 82/03735 | * | 10/1982 | (WO) . |

* cited by examiner

Primary Examiner—S. Thomas Hughes
Assistant Examiner—Eric Compton
(74) Attorney, Agent, or Firm—Mark P. Calcaterra

(57) ABSTRACT

A specialized mounting arrangement for an accessory such as an engine driven air conditioner compressor to an engine is utilized featuring a pair of press fitted bushings in a pair of arms of the mount and a single bolt extending therethrough. The arms of the mount assembly are constructed so that they straddle portions of an anchor member attached to the engine. A connector bolt is inserted through one bushing in one arm of the mount and then thorough a passage in the anchor member, and next into engagement with internal threads carried by the other bushing which his carried by the other arm of the mount. Rotation of the bolt moves the bushings toward one another and against the ends of the anchor member to clamp the anchor and thus the accessory therebetween. This clamping construction permits the accessory and mount to be adjusted axially relative to the bold so the accessory can be aligned relative to the engine drive arrangement before the accessory is finally affixed to the engine in a non-adjusting fashion.

6 Claims, 4 Drawing Sheets

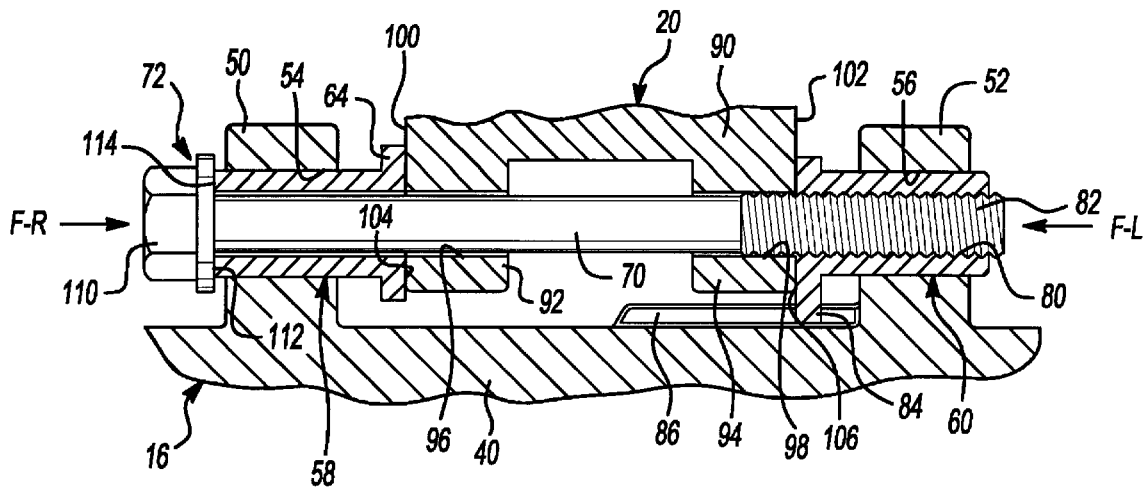
*Fig-2*
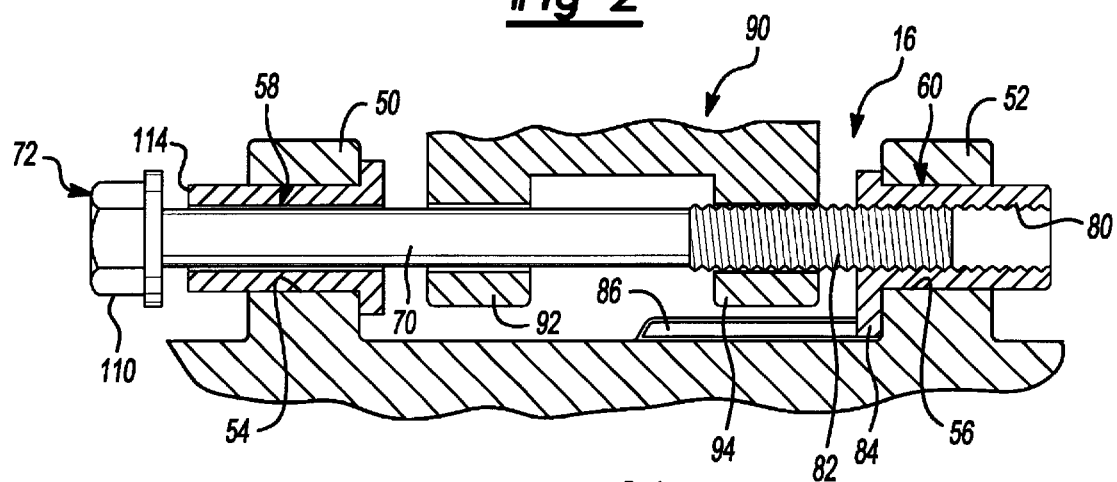
*Fig-2A*
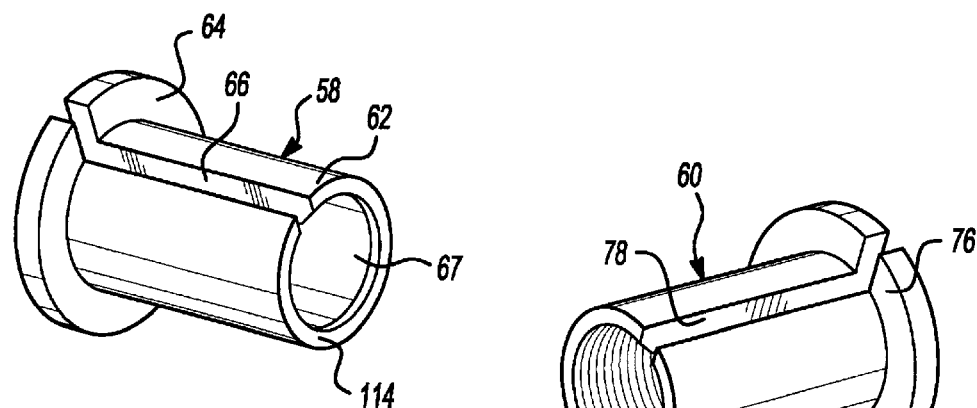
*Fig-3*
*Fig-4*

METHOD OF MOUNTING AND AXIALLY ALIGNING AN ENGINE ACCESSORY

FIELD OF THE INVENTION

This invention relates to the use of mounts for engine accessories and more particularly to a new and improved method of mounting an accessory which facilitates axial aligning the accessory.

BACKGROUND OF RELATED ART

Prior to the present invention various bracket constructions have been devised and utilized to mount automotive accessories to the engine so that they can be driven thereby and are accessible for service. Examples of such prior art are found in the following U.S. Pat. No. 3,730,147 to Buckwald for Engine Accessory Arrangement; U.S. Pat. No. 5,065,713 to W. Seats for Mounting Brackets For Mounting Engine Accessories; and U.S. Pat. No. 4,633,828 to L. Steele for Adjustable Polar Point Mount. While these prior art arrangements provide various constructions for accessory mounting and generally meet their objectives, they do not meet new and higher standards for attaching and supporting an accessory at a first point directly to the engine and then providing axial shifting of the accessory and mount for aligning the accessory for final attachment to the engine by at least one fastener. Moreover and in contrast to the present invention, the prior art mounting constructions and methods are not readily adaptable for accommodating relatively large tolerances common in mass produced components. Also, they do not conveniently and rigidly anchor the accessory at multiple attachment points to the engine so that the accessory is permitted to be axially shifted for positioning in a predetermined desired location for subsequently receiving a fastening member which finishes the attachment of the accessory to the engine and which is capable of handling relatively great torque inputs by a drive belt driven by the engine crankshaft. Furthermore, the prior constructions do not provide for material savings of engine compartment space and for self-locking and self-aligning with respect to the supporting structure.

BRIEF SUMMARY OF THE INVENTION

In vehicle applications, it is often desirable to mount accessory components such as the air conditioner compressor directly to the engine. Because engines have been downsized and engine components have become more cramped, the need has arisen to mount engine driven components by new arrangements and methods. Preferably, the arrangement should space the accessory close to the engine and in an accessible location to enhance service as well as to effectively utilize limited engine compartment space. The new and improved mounting arrangement of this invention meets such needs and requirements in one straightforward unit. More particularly, the mounting arrangement of this invention utilizes a pivotal lower mount assembly with two spaced arm portions having apertures therethrough in which a pair of press fitting bushings extend. A single fastener such as a threaded bolt extends through the two bushings and through a corresponding passage in the accessory which is positioned between the two arm portions. Preferably, one bushing is internally threaded to mesh with threads on the bolt and provision is made to eliminate rotation of the bushing and thus a need for an assembly tool such as a wrench to prevent rotation of the bushing during assembly. Subsequently, the accessory is pivoted about the single fastener of the lower mount so that another fastener can be utilized to firmly attach the accessory to the engine. This invention can be used to mount a variety of components particularly where additional remote mountings are used in conjunction with the mounting provided by this invention.

It is a feature, object and advantage of this invention to provide a new and improved mounting arrangement to facilitate connection of an accessory such as an air conditioner compressor to the vehicle engine. The mounting arrangement provides a self-locking and self aligning function prior to finally securing the accessory to the engine. The mount arrangement employs non-rotatable, axially sliding bushings that adjust axially to accommodate tolerance stack-up variations between the arms of the mount and the corresponding attachment structure of the accessory. Turning of the mounts single connecting bolt which extends through the mount arms and the attachment structure creates forces which axially move the bushings toward one another and against the engine's mount structure. This axial movement clamps and secures the accessory to the bushings and to the engine attachment structure. Due to the action of the sliding bushings, no undue axial clamp force is imparted to the arms of the mounting assembly or frame which could result in damaging the arms. Further, after attachment by the above described mount, the accessory can be pivoted and moved in an axial direction to position the accessory for final attachment to the engine by means of a fastener, such as a cap screw.

BRIEF DESCRIPTION OF THE DRAWINGS

These and other features objects and advantages of the present invention will become more apparent from the following detailed description and drawings in which:

FIG. 2 is an enlarged cross sectioned view of a part of an aligning and locking mount assembly attaching the air conditioner compressor to the engine taken generally along sight lines 2—2 of FIG. 1; and FIG. 2a is a sectioned view of part of the mounting assembly shown in FIG. 2 in which the connection bolt is in its pre-assembled position of the mount assembly: and FIG. 3 is an enlarged pictorial view of a first bushing used in the aligning and locking mount assembly of FIGS. 2 and 2a; and FIG. 4 is an enlarged pictorial view of a second bushing used in the aligning and locking mount assembly of FIGS. 2 and 2a.

DETAILED DESCRIPTION OF THE INVENTION

Figure 1:
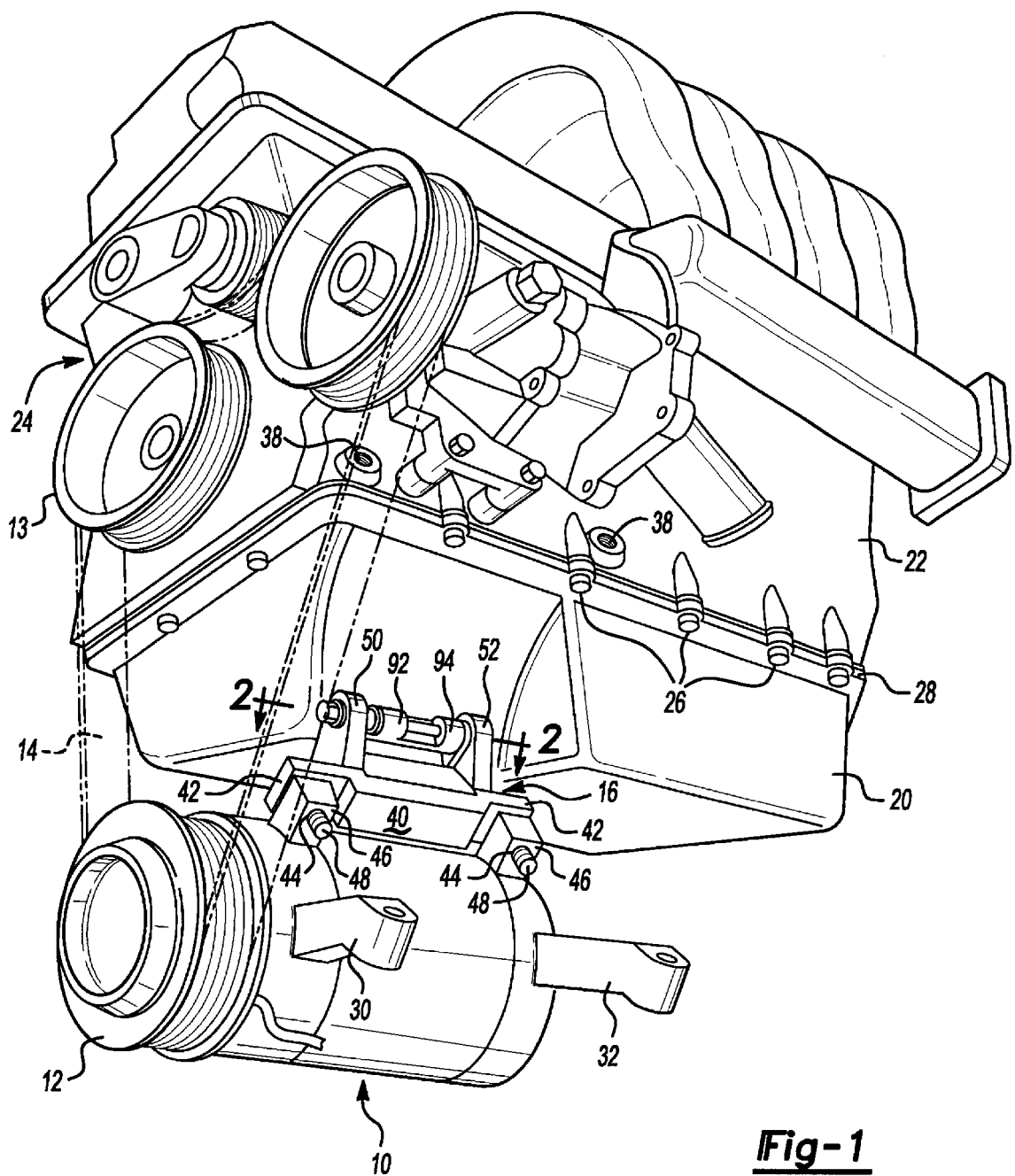
FIG. 1 is a pictorial view of a bottom portion of an internal combustion engine with an engine driven air compressor mounted thereto.

Turning now in detail to the drawings there is shown in FIG. 1 an accessory in the form of air conditioning compressor 10 having an input drive pulley 12 on the outboard end thereof conventionally driven by the engine crankshaft mounted pulley 13 through a serpentine drive belt 14. The compressor 10 is shown in a partially assembled condition operatively connected to the engine by a lower mount assembly 16. Specifically, the compressor 10 is mounted to the engine's oil pan 20 by mount assembly 16. The oil pan 20 in turn is attached to the engine block 22 of the vehicle engine 24 by screws 26. A gasket 28 is interposed between the oil pan 20 and the engine block 22 to effect fluid sealing between these two components.

Figure 5:
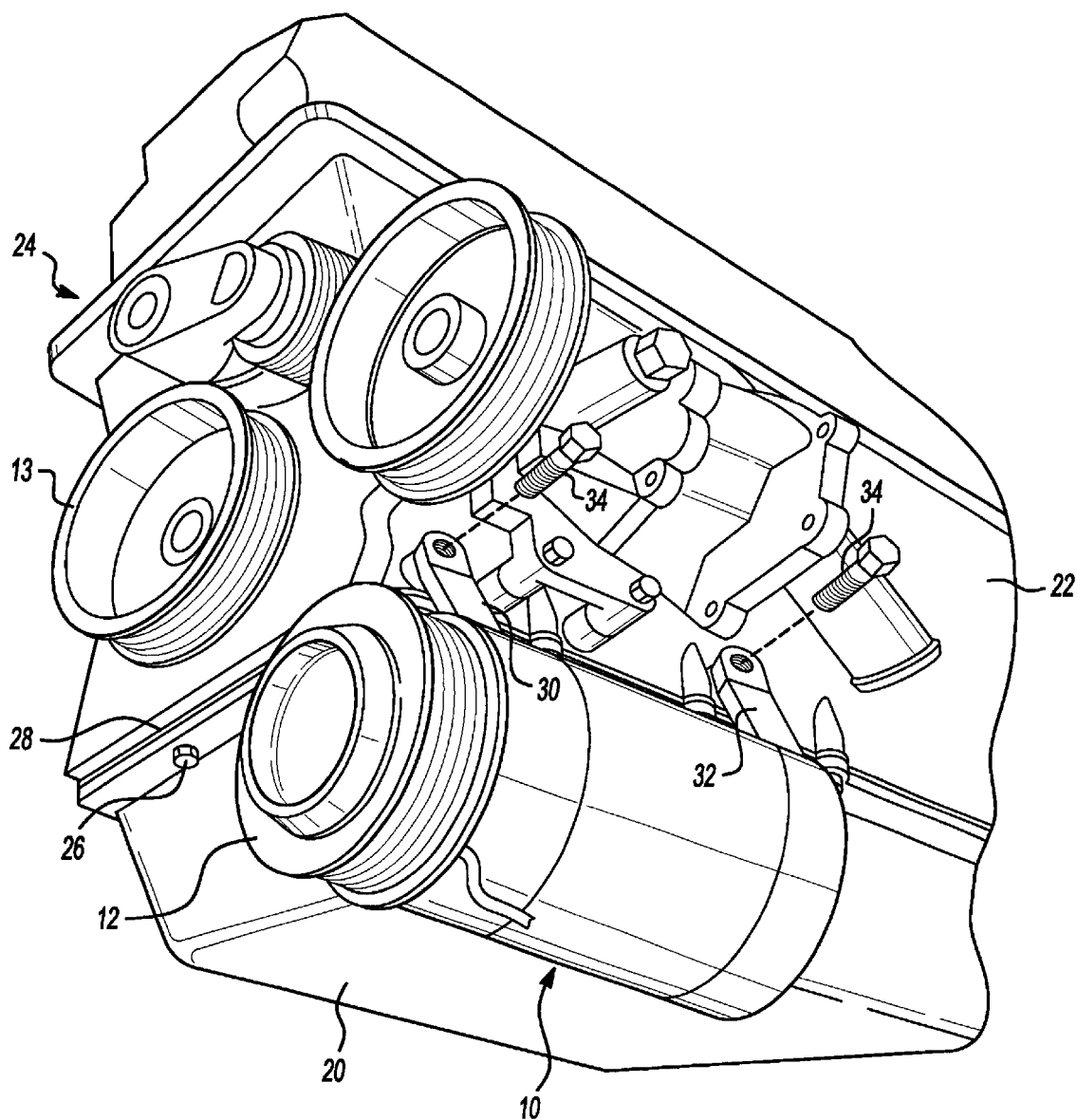
FIG. 5 is a pictorial view similar to FIG. 1 but showing the attachment of upper arm portions of the air conditioning compressor to the engine.
Figure 6:
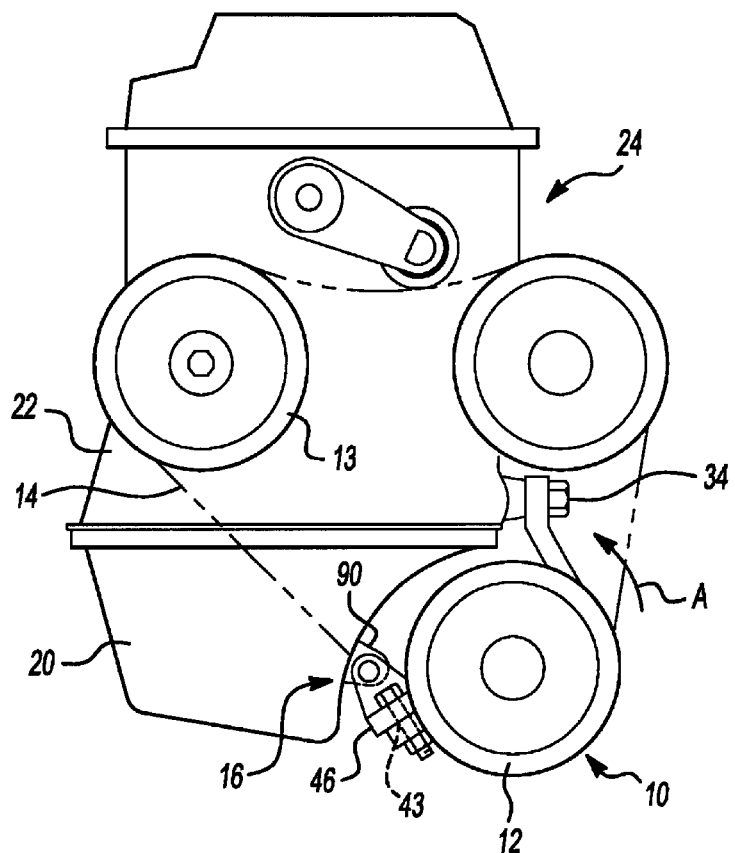
FIG. 6 is an end view of the engine of FIG. 1 illustrating another view of the attachment of the air conditioning compressor to the engine by the mounting assembly and by the upper attachment arms.

In FIGS. 5 and 6, the compressor 10 has been pivoted (counterclockwise in FIG. 6) to the final assembly position for connection to the engine block 22. This connection is in addition to the connection provided by the lower mount assembly 16 to the oil pan 20. Specifically, a pair of laterally spaced upper arms 30 and 32 of the compressor are directly attached to engine block 22 by fastener screws 34. These upper arms 30, 32 extend outwardly from opposite end portions of the compressor housing and are attached at their distal ends by the screws 34 which are adapted to thread into the internally threaded and laterally spaced bores 36 and 38 formed in the engine block 22 at remote points from the lower mount assembly 16.

Because the upper and lower connections of the compressor 10 are to different components of the engine (oil pan 20 and engine block 22) and since these different components are likely to be furnished by different suppliers, perhaps from more than one country, the design of the lower mount assembly is required to automatically compensate for limit stack (quantity production variation in parts tolerance) between the engine components and also between oil pan positioning and the anchor points by which the lower mount is attached to the accessory.

In a preferred embodiment, the lower mount assembly 16 has a generally rectilinear attachment or base frame 40 which has a pair of laterally extending attachment wings 42 located on opposite ends of the base 40. As seen in FIG. 6, wings 42 have aligned fastener openings 43 formed therein which align with threaded openings 44 formed in corresponding radically extending lug portions 46 of the housing of the compressor 10. Threaded fasteners 48 extend through the openings 43 in the wing portions and are threaded into the corresponding openings 44 in the lug portions 46. This securely couples the mount assembly 16 to compressor 10.

A pair of laterally spaced apart attachment arms 50, 52 of base frame 40 project away from and upwardly in FIG. 1. As seen in FIGS. 2, 2A, the arms 50, 52 of base frame 40 have cylindrical and axially aligned through-passages 54, 56. These passages respectively receive split bushings 58 and 60 which are press fitted in the passages 54, 56. The bushings are sized to frictionally fit in their passages so that they will not turn after being press fitted therein. Bushings 58, 60 may be conveniently made from powdered metal.

Details of preferred bushings 58, 60 are best shown in FIGS. 3 and 4. Bushing 58 has a generally cylindrically and tubular body 62 which extends axially from an enlarged and circular head portion 64. The body 62 and head portion 64 are split lengthwise by a longitudinal slit 66 allowing it to readily accommodate a range of diameters of passages 54. When the bushing 58 is inserted into the passage 54, the tubular body 62 is squeezed to effect a degree of closure of the slit 66. The recovery force exerted by body 62 in attempting to recover its relaxed configuration will frictionally hold the bushing in the passage 54 and inhibit rotate. The inner diameter cylindrical surface 67 of bushing 58 is preferably cylindrical and smooth and has a dimension sufficient to accommodate passage of the cylindrical shank 70 of a connector bolt 72 therethrough as seen in FIGS. 2 and 2A.

The other bushing 60 is generally like bushing 58 and has a cylindrical tubular body 74 and a contact head portion 76. As with bushing 58, the bushing 60 has a longitudinal slit 78 therein to create a tight press fit of the bushing in various diametered openings such as passage 56. Thus bushing 60 is held in passage by its natural recovery force exerted outwardly against the walls of the passage. In addition, the body 74 of bushing 60 is internally threaded with a helical thread 80 for meshing with a corresponding thread on the end portion 82 of the bolt 72.

The head portion 76 of bushing 60 also has a radially outwardly extending protuberance or tab 84. Tab 85 is designed to physically contact a raised stop 86 extending upward from the upper surface of the base 40 of the lower mount 16. This contact prevents rotation of the internally threaded bushing 60 as the bolt 72 is rotated from the pre-assembly position of FIG. 2A to the assembled position of FIG. 2. As attachment bolt 72 threads into the threaded opening 80 of bushing 60, the bushings 58, 60 are axially moved toward one another into a position where the head portions 64, 76 engage the compressor housing.

In this embodiment, the oil pan 20 is an aluminum casting formed with an integral and projecting accessory anchor portion 90. As best seen in FIG. 2, the anchor portion 90 includes a pair of laterally spaced and outwardly projecting attachment arms 92, 94. The arms 92, 94 have aligned openings 96, 98 of sufficient diameter to allow the shank 70 of bolt 72 to pass readily therethrough. The outboard side surfaces 100, 102 of arms 92, 94 are flattened for optimizing physical contact with the correspondingly flattened outer surfaces 104, 106 on the bushings 58, 60 when in a fully clamped and locked position assembled condition.

Preferably before assembly of the compressor 10 to the engine at the factory, the accessory mount assembly 16 is pre-installed on the compressor 10 so that its laterally spaced arms 50, 52 can then be conveniently positioned to straddle the arm portions 92, 94 of the anchor portion 90 of the oil pan 20. In this pre-assembled condition, bushings 58 and 60 are inserted into the passages 54, 56 and separated by a sufficient distance to accommodate a wide tolerance in the dimension of the anchor portion 90 of the oil pan. After the openings in the arms 92, 94 of the anchor portion 90 and the openings in the arms 50, 52 of the mount 16 are aligned, the bolt 72 is inserted through the first bushing 58, the openings 96 and 98 in the arms 92 and 94 of the anchor 90, and then into threaded engagement with the bushing 60. This stage of assembly is illustrated in FIGS. 1 and 2A.

Next, the enlarged polygonal head 110 of the bolt is turned by suitable tooling, such as a torque wrench to advance the bolt 72 into the threaded bushing 60. When the flattened side 112 of the bolt head engages the end 114 of bushing 58, the resultant inwardly directed force F-R of the bolt on the bushing 58 moves it to the right in FIG. 2A. Meanwhile, the threaded connection of bolt 72 and bushing 60 creates an inwardly directed pulling force F-L on bushing 60 causing its movement to the left in FIG. 2A. These forces F-R and F-L cause movement of the bushings 58, 60 toward one another. While the bushings are moved toward one another, they are inhibited from rotation in their associated passages 54, 56 by the press-fit therein. Also, the entry of the screw section of the bolt 72 into the corresponding threaded portion of bushing 60 creates a radial expansion effect which creates gripping force between bushing 60 and arm 52 to further secure this bushing against rotation.

The aforedescribed inward sliding movements of bushings 58, 60 continues until the end portions 64, 76 of bushings 58, 60 engage side surfaces 100 and 102 of arm portions 92 and 94. The resultant forcing of bushing 58, 60 against the surfaces 100, 102 of the anchor portion 90 further keep the bushings from rotation.

The above described sliding movement of bushings 58, 60 results in positioning of the compressor structure and self-alignment relative to the anchor portion 90 located between the spaced arm portions 50, 52 of the mount assembly 16. Once the compressor 10 fixed by engagement of the ends of bushing 58, 60 with the anchor portion, they are positioned in a desired axial operating position relative to the anchor. Thus, the outboard pulley portion 12 is aligned with the associated pulley 13 on the engine's crankshaft. This makes for a smooth transfer of driving power through the serpentine belt 14.

Moreover, with the above described sliding, clamping, aligning, and locking arrangement, the arm portions 50, 52 of mount 16 are not subjected to bending forces which might fractured them of otherwise damage them. This is because the clamping forces are routed through the bushings 58, 60 and on to the opposing side surfaces 100, 102 of the rigid anchor arms 92, 94.

The clamping and locking action shown in FIG. 2 is accomplished subsequent to the initial connection of the mount 16 to the anchor portion 90 as seen in FIG. 2A. Next, as illustrated by means of arrow "A" in FIG. 6, the accessory or compressor 10 can then be pivoted counterclockwise about the axis of bolt 72 to the final assembled position shown in FIGS. 5 and 6. Likewise, when the compressor is serviced by being replaced for example, the fasteners 34 can be removed and the compressor 10 can then be pivoted clockwise in FIG. 6 to a more accessible position. In either situation, the axial position of the compressor 10 can be adjusted by axial shifting of the bushings 58, 60 in passages 54, 56 before the compressor is firmly attached to the engine block 22 by fasteners 34 extending through apertures in upper arms 30, 32 and into treaded openings 36, 38. With the compressor 10 secured at its upper arms 30, 32, the bolt 72 is then be tightened to a desired torque which completes the mounting operation of the compressor 10 to the engine. As bolt 72 is rotated during this final step, threaded bushing 60 is inhibited from rotation in passage 56 by interaction between tab 84 and raised portion 86.

Figure 7:
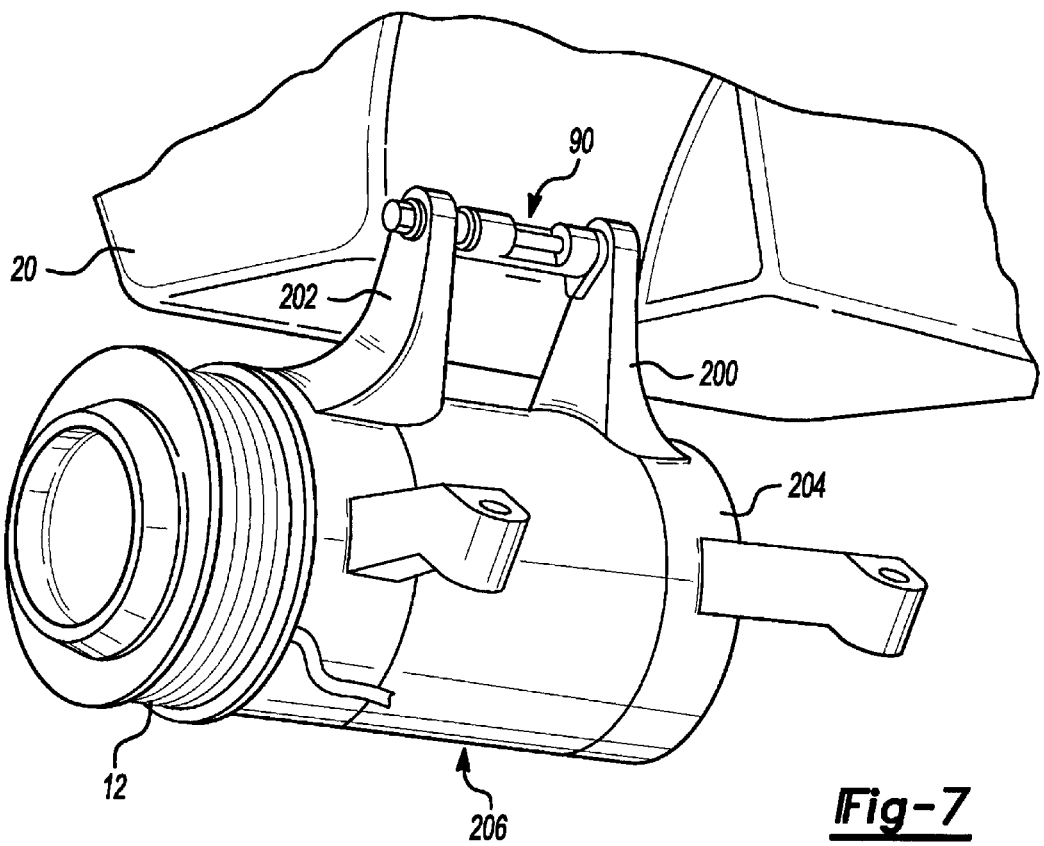
FIG. 7 is a pictorial view of another embodiment of the invention illustrated by an accessory with integral mounting attachment arms that incorporate the features of the separate aligning and locking mount component shown in FIGS. 1–6.

FIG. 7 illustrates a modification of the invention in which the locking mount assembly includes laterally spaced arm portions 200, 202 which are integrally formed from the accessory or compressor housing 204. The associated bushings and other componentry of the mount arrangement remain substantially the same as in the previously described embodiment. If desired, these bushings could be keyed or splinted into the arms 200, 202 to allow their clamping action while preventing their rotation.

Modification and variation to the structure and operation of the present invention are contemplated in light of the disclosure of preferred embodiments of this invention. It is therefore to be understood, that the operation of the invention may be practiced in other manners than as specifically described.

The embodiments of the invention in which an exclusive property or privilege is set forth as follows:

1. A multi-step method for securing an accessory to an internal combustion engine utilizing a mount assembly carried by the accessory and having a pair of spaced apart arms with aligned passages therethrough, a pair of bushings one in each of the passages and fitted to permit relative axial movement between the bushings and the arms, an apertured anchor portion of the engine adapted to be straddled by the spaced pair of arms, an elongated member which can be extended through the bushings and through the apertured anchor, and co-operative means between the elongated member and one bushing so that rotation of the elongated member exerts an axially directed force on the bushings causing movement of the bushings toward one another, the accessory securing method, comprising the steps of:

locating the accessory relative to the engine so that a spaced arm of the mounting assembly is positioned to either side of the anchor portion and with the passages and aperture in the anchor coaxial;

inserting the elongated member first through one bushing, then through the aperture in the anchor portion, and finally into the other bushing, thus positioning the accessory in a partially assembled operative mounted position;

rotating the elongated member to engage the cooperative means of the elongated member and the other bushing and thereby producing axial movement of each bushing toward the anchor portion until an end of each bushing bears against a surface of the anchor portion, thereby clamping the anchor portion between the bushings;

pivoting the accessory about the axis of the elongated member from the partially assembled operative mounting position to a final operative mounted position where the accessory extends closely adjacent the engine; and providing fastener means between the accessory and the engine to firmly secure the accessory into a final assembled operative mounting to the engine.

2. The mounting method as set forth in claim 1 in which the co-operative means between the elongated member and the other bushing is characterized by a threaded end portion of the elongated member and a similarly threaded internal bore through the other bushing, wherein engaging the cooperative means comprises:

engaging the threaded end portion of the elongated member with the similarly threaded internal bore of the other bushing.

3. The mounting method as set forth in claim 1 in which the accessory has at least one projecting arm with a bore therethrough, the engine has at least one threaded opening placed to be aligned with the bore, and a bolt is inserted through the bore and into the threaded opening for finally attaching the accessory to the engine.

4. The mounting method as set forth in claim 1, the mount assembly having a lower mount portion and the pair of spaced apart arms extending from the lower mount portion, further comprising:

preventing rotation of the bushing having the cooperative means, during rotation of the elongated member, by utilizing a tab extending from the bushing and a raised stop extending from the lower mount positioned to contact the tab and prevent rotation of the bushing.

5. A multi-step method for securing an accessory to an internal combustion engine utilizing a mount assembly carried by the accessory with first and second spaced apart arms each with a passage formed therethrough which passages are aligned, a first bushing defining a bore therethrough and a second bushing defining a threaded bore therethrough wherein each bushing is mounted in one of the passages and fitting therein to inhibit rotation but permit axial movement in the passage, an apertured anchor portion carried by the engine and being adapted to be straddled by the spaced apart arms, an elongated member with a threaded end portion adapted to be inserted through the first bushing, through the aperture of the anchor portion, and into the threads of the second bushing wherein rotation of the elongated member creates axially directed forces on the first and second bushings causing movement towards one another, the accessory securing method, comprising the steps of:

- locating the accessory relative to the engine and its anchor portion so one of the spaced arms of the mounting assembly is positioned to either side of the anchor portion;
- aligning the axes of the passages and bushings in the arms and the aperture of the anchor portion;
- inserting the elongated member first through one bushing, then through the aperture in the anchor portion, and finally into threaded co-operative relationship with the second bushing, thus securing the accessory in a partially assembled operative mounted position;
- rotating the elongated member to cause axial movements of each bushing toward the anchor portion until an end of each bushing engages a side surface of the anchor portion, thereby clamping the anchor portion between the bushings;
- pivoting the accessory about the axis of the elongated member from the partially assembled operative mounted position to a final operative mounted position where the accessory is positioned closely adjacent the engine; and
- providing fastener means between the accessory and the engine to firmly secure the accessory into a final assembled operative mounted position.

6. The mounting method as set forth in claim 5 in which the accessory has at least one projecting arm with a bore therethrough, the engine has at least one threaded opening placed to be aligned with the bore, and a bolt is inserted through the bore and into the threaded opening for finally attaching the accessory to the engine.

* * * * *